United States Patent [19]

Lee

[11] Patent Number: 5,244,241
[45] Date of Patent: Sep. 14, 1993

[54] WEEDING AND PICKING IMPLEMENT

[76] Inventor: Chih-chiang Lee, 436 Windflower La., Placentia, Calif. 92670

[21] Appl. No.: 947,289

[22] Filed: Sep. 18, 1992

[51] Int. Cl.$^5$ .............................................. A01B 1/16
[52] U.S. Cl. .................................... 294/50.6; 294/61
[58] Field of Search ............... 294/19.1, 23.5, 49–50.9, 294/55.5, 61, 99.1, 20, 125, 126; 7/114; 111/92, 99, 101, 106, 115; 172/21, 22, 371, 375, 378, 380; 254/132

[56] References Cited

U.S. PATENT DOCUMENTS

| 409,619 | 8/1889 | Stebbins | 294/50.6 X |
|---|---|---|---|
| 423,640 | 3/1890 | Stiles | 294/50.6 X |
| 1,056,614 | 3/1913 | Weikert | 294/50.6 |
| 2,049,713 | 8/1936 | Marshall | 294/50.6 |
| 2,066,803 | 1/1937 | Sawyer | 294/50.6 X |
| 2,121,265 | 6/1938 | Ruffcorn | 294/50.6 X |
| 2,317,801 | 4/1943 | Power | 294/50.6 |
| 2,437,393 | 3/1948 | Kramer | 294/50.6 |
| 2,443,828 | 6/1948 | Lamb | 294/50.6 |
| 3,333,881 | 8/1967 | Hollinger | 294/50.6 X |
| 3,443,830 | 5/1969 | Jones | 294/50.6 X |

FOREIGN PATENT DOCUMENTS

| 55590 | 12/1938 | Denmark | 294/50.6 |
|---|---|---|---|
| 809765 | 3/1936 | France | 294/50.6 |
| 15529 | of 1909 | United Kingdom | 294/50.6 |

Primary Examiner—Johnny D. Cherry

[57] ABSTRACT

A weeding and picking tool includes a shaft member having a handle formed on an upper portion of the shaft member and two stick members bifurcated on a lower portion of the shaft member, with a first stick member straightened to be longer than a second stick member of which a hook portion is formed on a bottom of the second stick member adapted to hold weed roots on the hook portion when digging the tool into the earth, whereby upon a rotation of the tool about the first straight stick member, the weed roots will be wound on the two stick members for an easier pulling and removal of the weeds from the earth.

1 Claim, 7 Drawing Sheets

WEEDING AND PICKING IMPLEMENT

BACKGROUND OF THE INVENTION

1. Field of the Invention

The present invention relates to the removal of the weeds that are present in a yard, a lawn, a park, or any agricultural field.

2. Description of the Prior Art

The weakness of conventional tools in this field, such as a spade, a rake, a combined hoe and fork, a trowel, whatever kind of weeders as I have seen, is that they would inevitably create a big hole or destroy too much green earth surface. That is one of the main reasons why the people at large have preferred using weedicides which are very poisonous chemicals.

SUMMARY OF THE INVENTION

The most important object of the present invention is to provide a set of weeders that can be used so easily yet so efficiently in plucking various sorts of weeds so that the people at large could be interested in using this set of tools to remove weeds. Except for such exceptionally large and tough weeds as the crabgrass, the average removal speed is definitely no more than five seconds if the earth has proper moisture or is properly watered. The user can easily remove any weeds with short roots in less than three seconds. In the case of the crabgrass there is an accessory item in the kit container which is not included here.

Another important object of the present invention is to provide a device that will not make any large hole or destroy too much green earth surface when the user can properly use this set of tools, as there tools will be made in different sizes according to different sizes of the roots of the weeds. Conventional weeders have not been so specifically designed so that they cannot remove weeds without destroying too much green earth; while the present set of tools can.

Another object of the present invention is to provide a series of tools that are not only good gardening or farming tools but the user will also find it a good kind of exercise to work with these tools.

DESCRIPTION OF THE PREFERRED EMBODIMENTS

Figure 1:
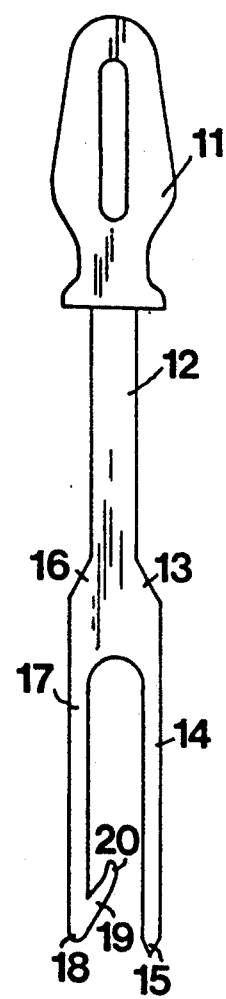
FIG. 1 represents a front view of a weeding and picking implement of the present invention.
Figure 2:
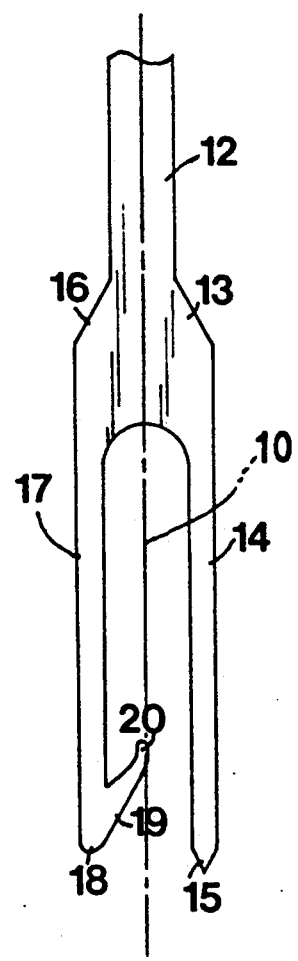
FIG. 2 is a perspective view of the hook and the helping stick on an enlarged scale.
Figure 3:
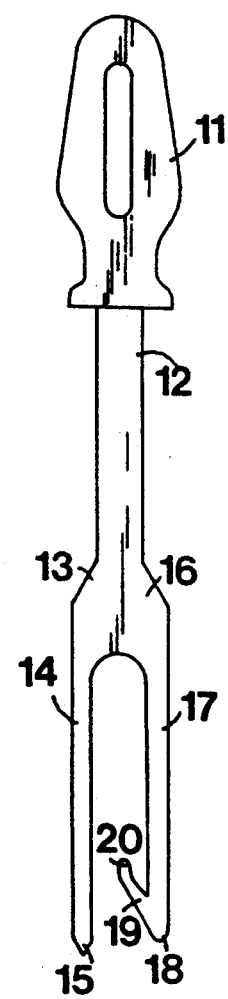
FIG. 3 represents an elevational view from the rear.
Figure 4:
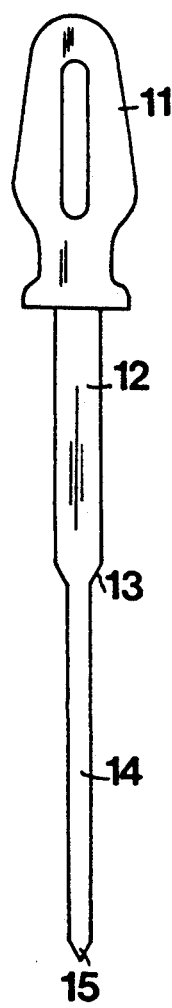
FIG. 4 represents a side view of the a weeding and picking implement of the present invention.

In accordance with the present invention, a weeding and picking implement has two straight sticks, in which one straight stick is formed with a hook on a lower end portion of the straight stick.

The duty of the hook is to catch and pluck up the roots of the weeds, but usually its duty cannot be as quickly done without the help of the straight stick in the opposite direction. Accordingly, this straight stick is called the helping stick.

The hook that is formed of a straight stick and an obliquely extending stick which can be either straight or curved, has been so specifically devised that one particular hook can easily catch and firmly hold the roots of the weeds the diameters of which are specifically fit for the inside triangular gap of the hook.

After the roots are caught by the hook or hooks, they can be either directly plucked up or first wound up about the helping stick to a certain degree and then plucked up, depending on how long the roots of the plucked weed are.

As there may exist individual preferences and particular situations, individual users can employ this series of tools in a variety of operative ways so as to successfully deal with different sizes, lengths and varied structural features of the roots of the weeds. Therefore, in addition to a number of suggested operative methods, the user can choose his own ways to work, according to his particular circumstances or individual preferences.

The features of this set of inventions are best understood by reference to the attached drawings where the same reference number is used in all drawings for the same feature.

EMBODIMENT OF FIG. 1 THROUGH FIG. 4

As shown in FIG. 1 through 4, 11 represents the handle of the weeding and picking implement 12 represents the shaft located between the handle and the branched sticks; 13 and 16 are mutually located on the section where the shaft begins to branch. Now both branched sticks naturally form a fork. 14 is one of two straight sticks that helps the other hold and wind up the roots of the caught weed. In a single-hooked weeding implement of the present invention, this stick is a little longer, ranging from 2 to 3 mm, than the stick with a hook on the opposite direction; 15 is a straight end portion of this stick. 17 is the other stick at the end of which there is a hook formed on the straight stick 17 and the obliquely extending stick 19. In the single-hooked weeding and picking implement, the obliquely extending stick 19 is protruded inwardly towards a central line 10 interposed between the two straight sticks 14 and 17, that is, the half of the span between these two sticks. 18 is the end of the straight stick 17 and also the bottom of the hook that is formed between 17 and 19. The uppermost tip portion 20 of the obliquely extending stick 19 is slightly bent upwardly vertically in order to help the roots pass by the hook without being hindered during the weeding operation.

EMBODIMENT OF FIGS. 5, 6 AND 7

Figure 5:
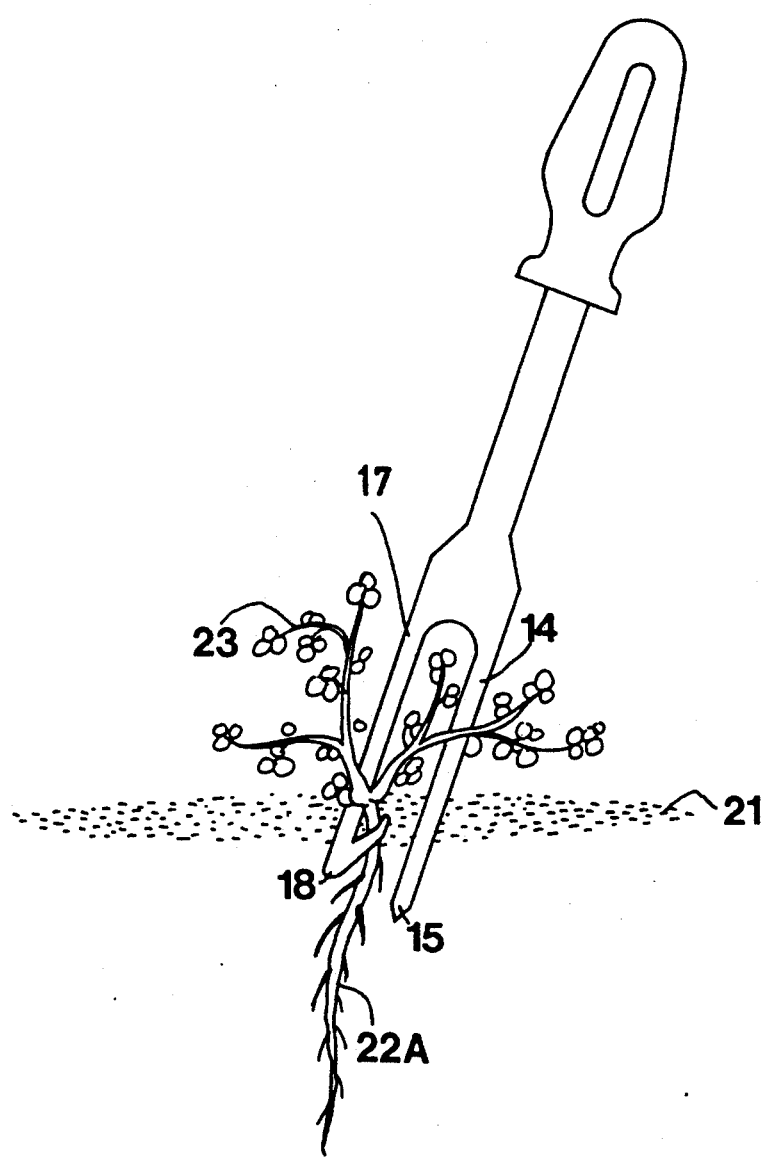
FIG. 5 represents how the weeding and picking implement stated above is used.

22A as shown in FIG. 5 represents the roots of weeds that are thin, long but flexible and considerably strong. When beginning to pluck the weeds, the user should first have the fork of the plucker so placed that the roots of the weed can stand between the hooked stick and the helping stick 14 as shown in FIG. 5 in which 21 represents the earth surface; 18 the hook; 15 the end of the helping stick, 22A represents the kind of roots that is then and long; 23 the leaves of the weed.

Figure 6:
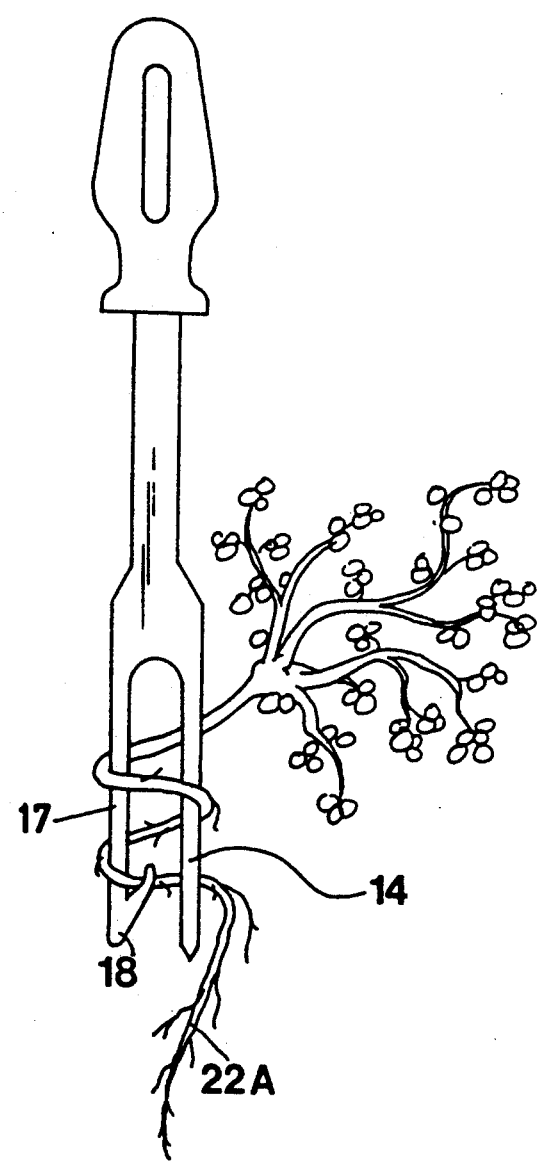
FIG. 6 represents how the roots of the weed are wound up.

When the fork of the weeding and picking implement arrives at a proper depth, the user should moderately move the fork to the left side (now the hook is regarded as being on the right side) or direct the hook at an advantageous angle so that the hook can easily catch the roots. The following step is that the user should pull up the weeding and picking implement. Usually the roots are caught now and then he should wind the fork about the stick 14 if the roots are very long, as shown by 22A in FIG. 6; naturally, he need not wind if the roots are short because the weed now has already been caught in the inside triangular gap of the hook and in the meantime moved away from the earth after a pull.

Figure 7:
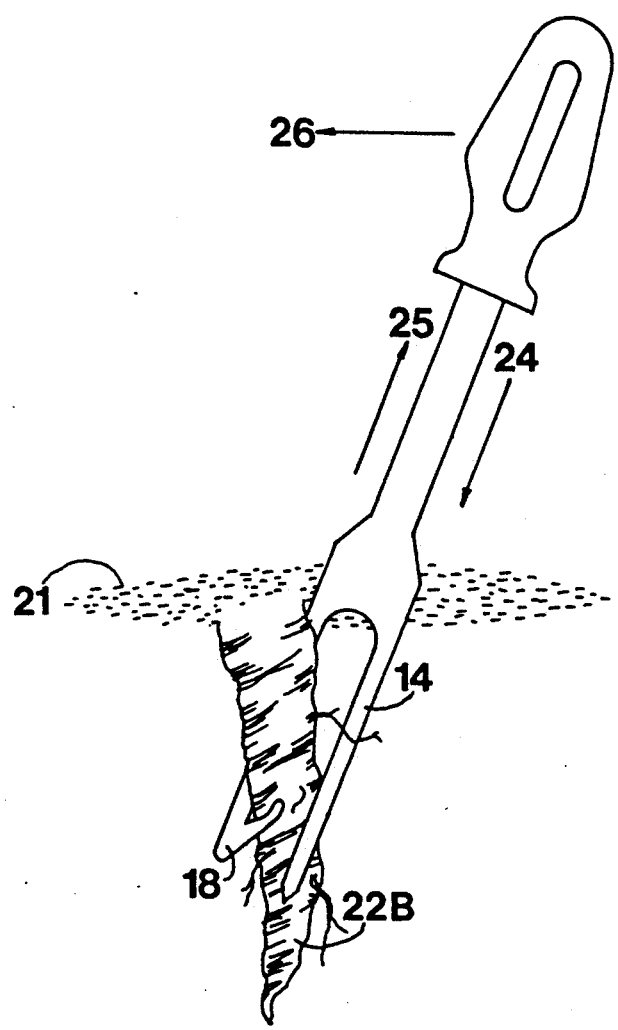
FIG. 7 represents a sort of plucking way of a large-sized plucker, in which the weeding implement is dug into the earth at an angle of approximately 70 degrees.

In the case of thick roots, the large-sized weeding and picking implement is to be used as shown in FIG. 7 in which 22B represents a kind of large roots; 18 the hook; 14 the helping stick; 24 indicates the direction in which the weeding and picking implement has been dug into the earth; 25 shows the direction in which the weeding and plucking implement is to be pulled up; 26 indicates that the handle should be moderately moved to the left when it is being pulled so that the user can pluck the weed up at a comparatively vertical angle; and 21 represents the earth surface.

What is claimed is:

1. A weeding and picking implement comprising:
a shaft member having a handle connected to an upper portion of said shaft member; two stick members bifurcated from a lower portion of said shaft member including a first straight stick member having a straight end portion formed on a lowest end portion of said first straight stick member, and a second straight stick member, juxtapositioned to the first stick member, having a hook portion formed on a lowest end portion of said second stick member, and having an obliquely extending stick portion having an uppermost tip portion protruding inwardly and upwardly towards a central line interposed between said two stick members and slightly bent upwardly vertically for allowing weed roots to pass by said hook portion for smoothly picking weed roots on said hook portion of said implement, with a first length of said first stick member ended at said straight end portion longer than a second length of said second stick member ended at a bottom of said hook portion, whereby upon a digging of said implement into earth to pick up roots of a weed on said hook portion of said stick member and upon a rotation of said implement about said first stick member in the earth, said roots of the weed will be wound on said two stick members for an easy pulling and removing of the weed.

* * * * *